US 6,633,164 B2

(12) United States Patent
Vinegar et al.

(10) Patent No.: US 6,633,164 B2
(45) Date of Patent: Oct. 14, 2003

(54) MEASURING FOCUSED THROUGH-CASING RESISTIVITY USING INDUCTION CHOKES AND ALSO USING WELL CASING AS THE FORMATION CONTACT ELECTRODES

(75) Inventors: Harold J. Vinegar, Houston, TX (US); Robert Rex Burnett, Katy, TX (US); William Mountjoy Savage, Houston, TX (US); Frederick Gordon Carl, Jr., Houston, TX (US); John Michele Hirsch, Houston, TX (US); Peter Anthony Crossley, Austin, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/798,192

(22) Filed: Mar. 2, 2001

(65) Prior Publication Data

US 2001/0033164 A1 Oct. 25, 2001

Related U.S. Application Data

(60) Provisional application No. 60/177,999, filed on Jan. 24, 2000, provisional application No. 60/178,000, filed on Jan. 24, 2000, provisional application No. 60/178,001, filed on Jan. 24, 2000, provisional application No. 60/177,883, filed on Jan. 24, 2000, provisional application No. 60/177,998, filed on Jan. 24, 2000, provisional application No. 60/177,997, filed on Jan. 24, 2000, provisional application No. 60/181,322, filed on Feb. 9, 2000, provisional application No. 60/186,376, filed on Mar. 2, 2000, provisional application No. 60/186,380, filed on Mar. 2, 2000, provisional application No. 60/186,505, filed on Mar. 2, 2000, provisional application No. 60/186,504, filed on Mar. 2, 2000, provisional application No. 60/186,379, filed on Mar. 2, 2000, provisional application No. 60/186,375, filed on Mar. 2, 2000, provisional application No. 60/186,382, filed on Mar. 2, 2000, provisional application No. 60/186,503, filed on Mar. 2, 2000, provisional application No. 60/186,527, filed on Mar. 2, 2000, provisional application No. 60/186,393, filed on Mar. 2, 2000, provisional application No. 60/186,394, filed on Mar. 2, 2000, provisional application No. 60/186,531, filed on Mar. 2, 2000, provisional application No. 60/186,377, filed on Mar. 2, 2000, provisional application No. 60/186,381, filed on Mar. 2, 2000, and provisional application No. 60/186,378, filed on Mar. 2, 2000.

(51) Int. Cl.[7] .............................. G01V 3/18; G01V 3/24
(52) U.S. Cl. ..................... 324/355; 324/368; 324/373
(58) Field of Search ................................ 324/355, 368, 324/373, 371, 375, 366

(56) References Cited

U.S. PATENT DOCUMENTS

| | | | |
|---|---|---|---|
| 525,663 A | 9/1894 | Mottinger | |
| 2,917,004 A | 12/1959 | Davis et al. | |
| 3,083,771 A | 4/1963 | Chapman | |
| 3,247,904 A | 4/1966 | Wakefield, Jr. | |
| 3,427,989 A | 2/1969 | Bostock et al. | |
| 3,566,963 A | 3/1971 | Blackledge | 166/189 |
| 3,602,305 A | 8/1971 | Kisling, III | 116/134 |
| 3,732,728 A | 5/1973 | Fitzpatrick | 73/151 |
| 3,793,632 A | 2/1974 | Still | 340/18 |
| 3,814,545 A | 6/1974 | Waters | 417/90 |
| 3,837,618 A | 9/1974 | Juhel | 251/129 |
| 3,980,826 A | 9/1976 | Widmer | 178/68 |
| 4,068,717 A | 1/1978 | Needham | 166/272 |
| 4,087,781 A | 5/1978 | Grossi et al. | 340/18 |
| 4,295,795 A | 10/1981 | Gass et al. | 417/111 |
| 4,393,485 A | 7/1983 | Redden | 367/25 |
| 4,468,665 A | 8/1984 | Thawley et al. | 340/856 |
| 4,545,731 A | 10/1985 | Canalizo et al. | 417/86 |
| 4,576,231 A | 3/1986 | Dowling et al. | 166/248 |
| 4,578,675 A | 3/1986 | MacLeod | 340/855 |
| 4,596,516 A | 6/1986 | Scott et al. | 417/58 |
| 4,630,243 A | 12/1986 | MacLeod | 367/82 |
| 4,648,471 A | 3/1987 | Bordon | 175/4.55 |
| 4,662,437 A | 5/1987 | Renfro | 166/65.1 |
| 4,681,164 A | 7/1987 | Stacks | 166/304 |
| 4,709,234 A | 11/1987 | Forehand et al. | 340/856 |
| 4,738,313 A | 4/1988 | McKee | 166/372 |
| 4,739,325 A | 4/1988 | MacLeod | 340/854 |
| 4,839,644 A | 6/1989 | Safinya et al. | 340/854 |
| 4,886,114 A | 12/1989 | Perkins et al. | 166/65.1 |
| 4,901,069 A | 2/1990 | Veneruso | 340/853 |
| 4,972,704 A | 11/1990 | Wellington et al. | 73/155 |
| 4,981,173 A | 1/1991 | Perkins et al. | 166/66.4 |
| 5,001,675 A | 3/1991 | Woodward | 367/13 |
| 5,008,664 A | 4/1991 | More et al. | 340/854 |
| 5,034,371 A | 7/1991 | Tanaka et al. | 503/227 |

| | | | |
|---|---|---|---|
| 5,130,706 A | 7/1992 | Van Steenwyk | 340/854.6 |
| 5,134,285 A | 7/1992 | Perry et al. | 250/269 |
| 5,160,925 A | 11/1992 | Dailey et al. | 340/853.3 |
| 5,162,740 A * | 11/1992 | Jewell | 324/347 |
| 5,172,717 A | 12/1992 | Boyle et al. | 137/155 |
| 5,176,164 A | 1/1993 | Boyle | 137/155 |
| 5,191,326 A | 3/1993 | Montgomery | 340/855.5 |
| 5,230,383 A | 7/1993 | Pringle et al. | 166/66.4 |
| 5,246,860 A | 9/1993 | Hutchins et al. | 436/27 |
| 5,251,328 A | 10/1993 | Shaw | 455/73 |
| 5,257,663 A | 11/1993 | Pringle et al. | 166/66.4 |
| 5,267,469 A | 12/1993 | Espinoza | 73/40.5 |
| 5,278,758 A | 1/1994 | Perry et al. | 364/422 |
| 5,331,318 A | 7/1994 | Montgomery | 340/855.4 |
| 5,353,627 A | 10/1994 | Diatschenko et al. | 73/19.03 |
| 5,358,035 A | 10/1994 | Grudzinski | 166/53 |
| 5,367,694 A | 11/1994 | Ueno | 395/800 |
| 5,394,141 A | 2/1995 | Soulier | 340/854.4 |
| 5,396,232 A | 3/1995 | Mathieu et al. | 340/854.5 |
| 5,425,425 A | 6/1995 | Bankston | 166/377 |
| 5,447,201 A | 9/1995 | Mohn | 166/375 |
| 5,458,200 A | 10/1995 | Lagerlef et al. | 166/372 |
| 5,467,083 A | 11/1995 | McDonald et al. | 340/854.6 |
| 5,473,321 A | 12/1995 | Goodman et al. | 340/854.9 |
| 5,493,288 A | 2/1996 | Henneuse | 340/854.4 |
| 5,531,270 A | 7/1996 | Fletcher et al. | 166/53 |
| 5,561,245 A | 10/1996 | Georgi et al. | 73/152.02 |
| 5,574,374 A | 11/1996 | Thompson et al. | 324/338 |
| 5,576,703 A | 11/1996 | MacLeod et al. | 340/854.4 |
| 5,587,707 A | 12/1996 | Dickie et al. | 340/870.09 |
| 5,592,438 A | 1/1997 | Rorden et al. | 367/83 |
| 5,662,165 A | 9/1997 | Tubel et al. | 166/250.01 |
| 5,723,781 A | 3/1998 | Pruett et al. | 73/152.18 |
| 5,730,219 A | 3/1998 | Tubel et al. | 66/250.01 |
| 5,745,047 A | 4/1998 | Van Gisbergen et al. | 340/853.1 |
| 5,782,261 A | 7/1998 | Becker et al. | 137/155 |
| 5,797,453 A | 8/1998 | Hisaw | 166/117.5 |
| 5,881,807 A | 3/1999 | Boe et al. | 166/100 |
| 5,883,516 A | 3/1999 | Van Steenwyk et al. | 324/366 |
| 5,887,657 A | 3/1999 | Bussear et al. | 166/336 |
| 5,896,924 A | 4/1999 | Carmody et al. | 166/53 |
| 5,934,371 A | 8/1999 | Bussear et al. | 166/53 |
| 5,937,945 A | 8/1999 | Bussear et al. | 166/250.15 |
| 5,941,307 A | 8/1999 | Tubel | 166/313 |
| 5,955,666 A | 9/1999 | Mullins | 73/152.18 |
| 5,959,499 A | 9/1999 | Khan et al. | 330/149 |
| 5,960,883 A | 10/1999 | Tubel et al. | 166/313 |
| 5,963,090 A | 10/1999 | Fukuchi | 330/149 |
| 5,971,072 A | 10/1999 | Huber et al. | 166/297 |
| 5,975,204 A | 11/1999 | Tubel et al. | 166/250.15 |
| 5,995,020 A | 11/1999 | Owens et al. | 340/854.9 |
| 6,012,015 A | 1/2000 | Tubel | 702/6 |
| 6,012,016 A | 1/2000 | Bilden et al. | 702/12 |
| 6,070,608 A | 6/2000 | Pringle | 137/155 |
| 6,123,148 A | 9/2000 | Oneal | 166/118 |
| 6,148,915 A | 11/2000 | Mullen et al. | 166/278 |
| 6,192,983 B1 | 2/2001 | Neuroth et al. | 166/250.15 |
| 6,208,586 B1 | 3/2001 | Rorden et al. | 367/35 |
| 6,334,486 B1 | 1/2002 | Carmody et al. | 166/53 |
| 6,484,800 B2 | 11/2002 | Carmody et al. | 166/53 |

FOREIGN PATENT DOCUMENTS

| | | | | |
|---|---|---|---|---|
| EP | 28296 | | 5/1981 | E21B/47/12 |
| EP | 295178 A2 | | 12/1988 | E21B/47/12 |
| EP | 339825 A1 | | 4/1989 | E21B/47/12 |
| EP | 492856 A2 | | 7/1992 | H04B/1/62 |
| EP | 641916 | | 3/1995 | E21B/49/08 |
| EP | 681090 A2 | | 11/1995 | E21B/47/18 |
| EP | 697500 A2 | | 2/1996 | E21B/49/00 |
| EP | 721053 A1 | | 7/1996 | E21B/47/12 |
| EP | 732053 | | 9/1996 | A21C/9/04 |
| EP | 919696 A2 | | 6/1999 | E21B/47/12 |
| EP | 922835 A2 | | 6/1999 | E21B/43/14 |
| EP | 930518 A2 | | 7/1999 | G01V/3/12 |
| EP | 964134 A2 | | 12/1999 | E21B/47/12 |
| EP | 972909 A2 | | 1/2000 | E21B/44/00 |
| EP | 999341 A2 | | 5/2000 | E21B/33/124 |
| FR | 2677134 | | 12/1992 | E02D/13/06 |
| GB | 2083321 A | | 3/1982 | H04B/5/00 |
| GB | 2325949 A | | 12/1998 | E21B/43/12 |
| GB | 2327695 A | | 2/1999 | E21B/43/12 |
| GB | 2338253 A | | 12/1999 | E21B/47/12 |
| WO | 80/00727 | | 4/1980 | E21B/47/12 |
| WO | 93/26115 | | 12/1993 | H04N/1/40 |
| WO | 96/00836 | | 1/1996 | E21B/47/12 |
| WO | 96/24747 | | 8/1996 | E21B/43/12 |
| WO | 97/16751 | | 5/1997 | G01V/3/00 |
| WO | 97 37103 | | 10/1997 | E21B/47/01 |
| WO | 98/20233 | | 5/1998 | E21B/43/40 |
| WO | 99/37044 | | 7/1999 | H04B/13/02 |
| WO | 99/57417 | | 11/1999 | E21B/41/00 |
| WO | 99/60247 | | 11/1999 | E21B/43/12 |
| WO | 00/04275 | | 1/2000 | E21B/47/01 |
| WO | 00/37770 | | 6/2000 | E21B/37/06 |
| WO | 01/20126 A2 | | 3/2001 | E21B/43/12 |
| WO | 01/55555 A1 | | 8/2001 | E21B/47/12 |

OTHER PUBLICATIONS

Brown.Connolizo and Robertson, West Texas Oil Lifting Short Course and H.W. Winkler, "Misunderstood or overlooked Gas–Lift Design and Equipment Considerations," SPE, p. 351 (1994).

Der Spek, Alex, and Aliz Thomas, "Neural–Net identification of Flow Regime with Band Spectra of Flow–Generated Sound", SPE Reservoir Eva. & Eng.2 (6) Dec. 1999, pp. 489–498.

Sakata et al., "Performance Analysis of Long Distance Transmitting of Magnetic Signal on Cylindrical Steel Rod", IEEE Translation Journal on magnetics in Japan, vol. 8, No. 2, Feb. 1993,, pp. 102–106.

Otis Engineering, Aug. 1980, "Heavy Crude Lift System", Field Development Report, OEC 5228, Otis Corp., Dallas, Texas, 1980.

* cited by examiner

*Primary Examiner*—N. Le
*Assistant Examiner*—Reena Aurora (57) ABSTRACT

A petroleum well (20) for producing petroleum products that incorporates a system adapted to controllably measure a formation resistivity using induction chokes (91-95) to form electrically isolated piping structure sections that can be used as the formation contact electrodes for time-varying current, and methods of producing petroleum products while measuring formation resistivity, are provided by the present invention. The system comprises a first induction choke (91), a second induction choke (92), and a device (50). The first induction choke (91) is located about a piping structure (30) of the well (20). The second induction choke (92) is also located about the piping structure (30) of the well (20), but the first induction choke (91) is distally spaced from the second induction choke (92). The device (50) is located outside of the piping structure (30) and comprises two terminals (71, 72). A first of the terminals (71) extending from the device (50) is electrically connected to the piping structure (30) on one side (81) of the first induction choke (91). A second of the terminals (72) extending from the device (50) is electrically connected to the piping structure (30) on another side (82) of the first induction choke (91), between the first and second induction chokes (91, 92), such that the downhole device (50) is electrically connected across an outside of the first induction choke (91). The system can further comprise other induction chokes (93–95), other terminals (97–99) extending from the device (50), a current sensor (114), a surface power source (54), a power transformer (104), a communications transformer (106), a surface modem (56), a downhole modem (102), a direct current power supply (101), and/or a power amplifier (110, 112). The piping structure can comprise at least a portion of a well casing (30), such that the well casing (30) acts as an electrode for making formation resistivity measurements due to the induction chokes (91–95).

40 Claims, 6 Drawing Sheets

MEASURING FOCUSED THROUGH-CASING RESISTIVITY USING INDUCTION CHOKES AND ALSO USING WELL CASING AS THE FORMATION CONTACT ELECTRODES

CROSS-REFERENCES TO RELATED APPLICATIONS

This application claims the benefit of the following U.S. Provisional Applications, all of which are hereby incorporated by reference:

COMMONLY OWNED AND PREVIOUSLY FILED U.S. PROVISIONAL PATENT APPLICATIONS

| T&K # | Serial Number | Title | Filing Date |
|---|---|---|---|
| TH 1599 | 60/177,999 | Toroidal Choke Inductor for Wireless Communication and Control | Jan. 24, 2000 |
| TH 1600 | 60/178,000 | Ferromagnetic Choke in Wellhead | Jan. 24, 2000 |
| TH 1602 | 60/178,001 | Controllable Gas-Lift Well and Valve | Jan. 24, 2000 |
| TH 1603 | 60/177,883 | Permanent, Downhole, Wireless, Two-Way Telemetry Backbone Using Redundant Repeater, Spread Spectrum Arrays | Jan. 24, 2000 |
| TH 1668 | 60/177,998 | Petroleum Well Having Downhole Sensors, Communication, and Power | Jan. 24, 2000 |
| TH 1669 | 60/177,997 | System and Method for Fluid Flow Optimization | Jan. 24, 2000 |
| TS 6185 | 60/181,322 | A Method and Apparatus for the Optimal Predistortion of an Electromagnetic Signal in a Downhole Communications System | Feb. 9, 2000 |
| TH 1599x | 60/186,376 | Toroidal Choke Inductor for Wireless Communication and Control | Mar. 2, 2000 |
| TH 1600x | 60/186,380 | Ferromagnetic Choke in Wellhead | Mar. 2, 2000 |
| TH 1601 | 60/186,505 | Reservoir Production Control from Intelligent Well Data | Mar. 2, 2000 |
| TH 1671 | 60/186,504 | Tracer Injection in a Production Well | Mar. 2, 2000 |
| TH 1672 | 60/186,379 | Oilwell Casing Electrical Power Pick-Off Points | Mar. 2, 2000 |
| TH 1673 | 60/186,375 | Controllable Production Well Packer | Mar. 2, 2000 |
| TH 1674 | 60/186,382 | Use of Downhole High Pressure Gas in a Gas Lift Well | Mar. 2, 2000 |
| TH 1675 | 60/186,503 | Wireless Smart Well Casing | Mar. 2, 2000 |
| TH 1677 | 60/186,527 | Method for Downhole Power Management Using Energization from Distributed Batteries or Capacitors with Reconfigurable Discharge | Mar. 2, 2000 |
| TH 1679 | 60/186,393 | Wireless Downhole Well Interval Inflow and Injection Control | Mar. 2, 2000 |
| TH 1681 | 60/186,394 | Focused Through-Casing Resistivity Measurement | Mar. 2, 2000 |
| TH 1704 | 60/186,531 | Downhole Rotary Hydraulic Pressure for Valve Actuation | Mar. 2, 2000 |
| TH 1705 | 60/186,377 | Wireless Downhole Measurement and Control For Optimizing Gas Lift Well and Field Performance | Mar. 2, 2000 |
| TH 1722 | 60/186,381 | Controlled Downhole Chemical Injection | Mar. 2, 2000 |
| TH 1723 | 60/186,378 | Wireless Power and Communications Cross-Bar Switch | Mar. 2, 2000 |

The current application shares some specification and figures with the following commonly owned and concurrently filed applications, all of which are hereby incorporated by reference:

COMMONLY OWNED AND CONCURRENTLY FILED U.S PATENT APPLICATIONS

| T&K # | Serial Number | Title | Filing Date |
|---|---|---|---|
| TH 1601US | PCT/US01/06985 | Wireless Reservoir Production Control | Mar. 2, 2001 |
| TH 1671 | PCT/US01/06800 | Tracer Injection in a Production Well | Mar. 2, 2001 |
| TH 1672 | PCT/US01/07004 | Oil Well Casing Electrical Power Pick-Off Points | Mar. 2, 2001 |
| TH 1673 | PCT/US01/06984 | Controllable Production Well Packer | Mar. 2, 2001 |
| TH 1674 | PCT/US01/06986 | Use of Downhole High Pressure Gas in a Gas-Lift Well | Mar. 2, 2001 |
| TH 1675 | PCT/US01/06907 | Wireless Communication Using Well Casing | Mar. 2, 2001 |
| TH 1677 | PCT/US01/06942 | Power Generation Using Batteries with Reconfigurable Discharge | Mar. 2, 2001 |
| TH 1679 | PCT/US01/06802 | Wireless Downhole Well Interval Inflow and Injection Control | Mar. 2, 2001 |
| TH 1704 | PCT/US01/06949 | Electrohydraulic Pressurized Downhole Valve Actuater | Mar. 2, 2001 |
| TH 1705 | PCT/US01/07003 | Wireless Downhole Measurement and Control For Optimizing Gas Lift Well and Field Performance | Mar. 2, 2001 |
| TH 1722 | PCT/US01/06985 | Controlled Downhole Chemical Injection | Mar. 2, 2001 |
| TH 1723 | PCT/US01/06747 | Wireless Power and Communications Cross-Bar Switch | Mar. 2, 2001 |

The current application shares some specification and figures with the following commonly owned and previously filed applications, all of which are hereby incorporated by reference:

COMMONLY OWNED AND PREVIOUSLY FILED U.S PATENT APPLICATIONS

| T&K # | Serial Number | Title | Filing Date |
|---|---|---|---|
| TH 1599US | 09/769,047 | Choke Inductor for Wireless Communication and Control | Jan, 24, 2001 |
| TH 1600US | 09/769,048 | Induction Choke for Power Distribution in Piping Structure | Jan, 24, 2001 |
| TH 1602US | 09/768,705 | Controllable Gas-Lift Well and Valve | Jan, 24, 2001 |

-continued

COMMONLY OWNED AND PREVIOUSLY
FILED U.S PATENT APPLICATIONS

| T&K # | Serial Number | Title | Filing Date |
|---|---|---|---|
| TH 1603US | 09/768,655 | Permanent Downhole, Wireless, Two-Way Telemetry Backbone Using Redundant Repeater | Jan, 24, 2001 |
| TH 1668US | 09/768,046 | Petroleum Well Having Downhole Sensors, Communication, and Power | Jan, 24, 2001 |
| TH 1669US | 09/768,656 | System and Method for Fluid Flow Optimization | Jan, 24, 2001 |
| TH 1783US | PCT/US02/02539 | Downhole Motorized Flow Control Valve | Jan, 24, 2001 |

The benefit of 35 U.S.C. § 120 is claimed for all of the above referenced commonly owned applications. The applications referenced in the tables above are referred to herein as the "Related Applications."

BACKGROUND

1. Field of the Invention

The present invention relates to a system for controllably measuring a formation resistivity using induction chokes to form electrically isolated well casing sections such that the well casing can be used as the formation contact electrodes. In one aspect, it relates to a petroleum production well and a method of operating the well while also being able to measure the formation resistivity using the well casing as the formation contact electrodes.

2. Description of Related Art

Formation resistivity is a fundamental measurement for the analysis and characterization of possible hydrocarbon production zones that the well passes through. Such a measurement is informative because the measured resistivity reflects both the porosity of the formation and the composition of the fluids that occupy the pore spaces. See e.g., WELL LOGGING FOR EARTH SCIENTISTS, Darwin V. Ellis, Elsevier, New York, USA, 1987, ISBN 0-444-01180-3 (incorporated by reference for background).

Measuring formation resistivity is customarily only done as part of the wireline well logging procedure before the well casing has been installed (open-hole) because a conventional metallic casing will normally act as an electrical short-circuit between elements of the formation, preventing the formation resistivity from being measured.

As a producing well withdraws fluids from a formation, it causes fluid migration toward the producing zones from more distant parts of the reservoir. The moving fluids may be oil, gas, water (usually as brine), or a mixture of these. Because hydrocarbons are electrically non-conductive and brine is relatively conductive, it would be valuable to measure resistivity changes in a producing well as an aid in monitoring changes in the spatial distribution of fluid migrations that are being caused by production and characterizing the changing conditions of the reservoir. However, because the resistivity normally cannot be measured after the well has been completed (i.e., after the well casing is installed), this analytical method is not generally or readily available to assist in planning of the production process and managing the reservoir during production operations.

All references cited herein are incorporated by reference to the maximum extent allowable by law. To the extent a reference may not be fully incorporated herein, it is incorporated by reference for background purposes, and indicative of the knowledge of one of ordinary skill in the art.

BRIEF SUMMARY OF THE INVENTION

The problems and needs outlined above are largely solved and met by the present invention. The casing is fitted with a number of electrically inductive chokes that are placed on the casing sections at the time the casing is set in the well. By suitable design these induction chokes act as impedances to time-varying current flow (e.g., alternating current) along the casing, and thus act to divert the current from the casing into the formation. Because the current must then pass through the formation, the impedance to such current flow provides a method to measure the resistivity of the formation adjacent to the borehole section where the induction chokes are placed and it allows the isolated casing sections to act as separate electrodes.

A variety of choke dispositions may be employed to control the path of current flow outside the casing and thus enable formation resistivity to be measured at various distances from the casing or various depths into the formation. The principle is similar to the conventional open hole focused wireline electric logging tools known as "laterologs." In conventional open hole laterologs, an array of current electrodes contact the exposed formation surface within the borehole, and the electrical potentials on these electrodes are controlled in a manner that causes a focused current to flow into the formation. Casing mounted chokes provide a similar function, but through the casing (for wellbores having a well casing or liner) and by using the casing sections as electrodes.

By controlling the frequency of the time-varying or alternating current, the impedance presented by the induction chokes may be altered, which allows for a separate and independent method of controlling the measurement conditions. Furthermore, one of the distinct advantages of the present invention is that the formation resistivity measurements may be performed during petroleum production operations, without changing the production well configuration (i.e., removing the production tubing) and without interrupting production processes.

In accordance with one aspect of the present invention, a system for measuring a formation resistivity in a petroleum well is provided. The system comprises a first induction choke, a second induction choke, and a device. The first induction choke is located about a piping structure of the well. The second induction choke is also located about the piping structure of the well, but the first induction choke is distally spaced from the second induction choke. The device is located outside of the piping structure and comprises two terminals. A first of the terminals extending from the device is electrically connected to the piping structure on one side of the first induction choke. A second of the terminals extending from the device is electrically connected to the piping structure on another side of the first induction choke between the first and second induction chokes, such that the downhole device is electrically connected across an outside of the first induction choke. The system can further comprise other induction chokes, other terminals extending from the device, a current sensor, a surface power source, a power transformer, a communications transformer, a surface modem, a downhole modem, a direct current power supply, and/or a power amplifier. The piping structure can comprise at least a portion of a well casing, such that the well casing acts as an electrode for making formation resistivity measurements due to the induction chokes.

In accordance with another aspect of the present invention, a petroleum well for producing petroleum products is provided. The petroleum well comprises a piping structure, a first induction choke, a second induction choke, a third induction choke, and a downhole device. The piping structure of the well extends within a formation, which may comprise an oil or gas production zone. The first induction choke is located downhole about the piping structure. The second induction choke is also located downhole about the piping structure, but the second induction choke is distally spaced from the first induction choke. In addition, the third induction choke is located downhole about the piping structure, and the third induction choke is distally spaced from the first and second induction chokes. The downhole device comprises four terminals. A first device terminal is electrically connected to the piping structure on a one side of the first induction choke. A second device terminal is electrically connected to the piping structure on another side of the first induction choke between the first and second induction chokes, such that the downhole device is electrically connected across an outside of the first induction choke. A first electrode terminal is electrically connected to the piping structure between the second and third induction chokes. A second electrode terminal is electrically connected to the piping structure such that the third induction choke is located between the electrical connection location on the piping structure of the first and second electrode terminals.

In accordance with yet another aspect of the present invention, a petroleum well for producing petroleum products is provided. The petroleum well comprises a well casing, a power source, a surface modem, a first induction choke, a second induction choke, a third induction choke, and a downhole device. The well casing extends into a formation. The power source is adapted to output a time-varying current. The power source has two power source terminals. A first of the power source terminals is electrically connected to the casing at the surface. A second of the power source terminals is electrically connected to the formation at the surface. The surface modem has two surface modem terminals. A first of the surface modem terminals is electrically connected to the casing at the surface. A second of the surface modem terminals is electrically connected to the formation at the surface. The first induction choke is located downhole about the casing. The second induction choke is located downhole about the casing, wherein the second induction choke is distally spaced from the first induction choke, and wherein the second induction choke is located farther downhole than the first induction choke. The third induction choke is located downhole about the casing, wherein the third induction choke is distally spaced from the first and second induction chokes, and wherein the third induction choke is located farther downhole than the second induction choke. The downhole device comprises four terminals, a downhole modem, and a current sensor. A first device terminal is electrically connected to the casing on a source-side of the first induction choke. A second device terminal is electrically connected to the casing on another side of the first induction choke between the first and second induction chokes, such that the downhole device is electrically connected across an outside of the first induction choke. A first electrode terminal is electrically connected to the casing between the second and third induction chokes. A second electrode terminal is electrically connected to the casing such that the third induction choke is located between the electrical connection location on the casing of the first and second electrode terminals. The downhole modem is communicably coupled to the device terminals, such that the downhole modem can send and receive communication signals along the casing via the device terminals. The current sensor is adapted to measure current flowing through the first electrode terminal and/or the second electrode terminal. The current sensor is communicably coupled to the downhole modem, such that the downhole modem is adapted to receive measurement data from the current sensor and transmit the measurement data to the surface modem via the casing.

In accordance with still another aspect of the present invention, a method of producing petroleum products from a petroleum well is provided. The method comprises the following steps (the order of which may vary): (i) providing a piping structure of the well; (ii) providing a system for measuring formation resistivity in the well, the system comprising: (a) a first induction choke located about the piping structure, (b) a second induction choke located about the piping structure, wherein the first induction choke is distally spaced from the second induction choke, and (c) a device located outside of the piping structure and comprising two terminals, a first of the terminals extending from the device being electrically connected to the piping structure on one side of the first induction choke, and a second of the terminals extending from the device being electrically connected to the piping structure on another side of the first induction choke between the first and second induction chokes, such that the downhole device is electrically connected across an outside of the first induction choke; and (iii) measuring the resistivity of a formation with the system while producing petroleum products with the well. The method may further comprise the step of: (iv) monitoring for changes in formation resistivity while producing petroleum products with the well by repeating the measuring step as needed. Also, the method may further comprise the steps of: (iv) providing a surface modem having two surface modem terminals, a first of the surface modem terminals being electrically connected to the piping structure at the surface, and a second of the surface modem terminals being electrically connected to the formation at the surface; (v) providing a downhole modem for the system, the downhole modem being communicably coupled to the terminals; and (vi) transmitting formation resistivity data generated in the measuring step to the surface modem with the downhole modem via the piping structure. In addition, the method may further comprise the steps of: (iv) providing a third induction choke as a part of the system, the third induction choke being located about the piping structure, and being distally spaced from the first and second induction chokes; (v) providing a measuring electrode terminal extending from the device and that is electrically connected to the piping structure between the second and third induction chokes; (vi) providing an electrical return electrode terminal extending from the device and that is electrically connected to the piping structure such that the third induction choke is located between the electrical connection location on the piping structure of the measuring electrode terminal and the electrical return electrode terminal; and (vii) providing a current sensor on the measuring electrode terminal such that the current sensor can measure electrical current flow within the measuring electrode terminal, such that the electrical current flow in the measuring electrode terminal correlates to the formation resistivity.

BRIEF DESCRIPTION OF THE DRAWINGS

Other objects and advantages of the invention will become apparent upon reading the following detailed description and upon referencing the accompanying drawings, in which.

DETAILED DESCRIPTION OF THE INVENTION

Referring now to the drawings, wherein like reference numbers are used herein to designate like elements throughout the various views, preferred embodiments of the present invention are illustrated and further described, and other possible embodiments of the present invention are described. The figures are not necessarily drawn to scale, and in some instances the drawings have been exaggerated and/or simplified in places for illustrative purposes only. One of ordinary skill in the art will appreciate the many possible applications and variations of the present invention based on the following examples of possible embodiments of the present invention, as well as based on those embodiments illustrated and discussed in the Related Applications, which are incorporated by reference herein to the maximum extent allowed by law.

As used in the present application, a "piping structure" can be one single pipe, a tubing string, a well casing, a pumping rod, a series of interconnected pipes, rods, rails, trusses, lattices, supports, a branch or lateral extension of a well, a network of interconnected pipes, or other similar structures known to one of ordinary skill in the art. A preferred embodiment makes use of the invention in the context of a petroleum well where the piping structure comprises tubular, metallic, electrically-conductive pipe or tubing strings, but the invention is not so limited. For the present invention, at least a portion of the piping structure needs to be electrically conductive, such electrically conductive portion may be the entire piping structure (e.g., steel pipes, copper pipes) or a longitudinal extending electrically conductive portion combined with a longitudinally extending non-conductive portion. In other words, an electrically conductive piping structure is one that provides an electrical conducting path from a first portion where a power source is electrically connected to a second portion where a device and/or electrical return is electrically connected. The piping structure will typically be conventional round metal tubing, but the cross-section geometry of the piping structure, or any portion thereof, can vary in shape (e.g., round, rectangular, square, oval) and size (e.g., length, diameter, wall thickness) along any portion of the piping structure. Hence, a piping structure must have an electrically conductive portion extending from a first portion of the piping structure to a second portion of the piping structure, wherein the first portion is distally spaced from the second portion along the piping structure.

The term "modem" is used herein to generically refer to any communications device for transmitting and/or receiving electrical communication signals via an electrical conductor (e.g., metal). Hence, the term "modem" as used herein is not limited to the acronym for a modulator (device that converts a voice or data signal into a form that can be transmitted)/demodulator (a device that recovers an original signal after it has modulated a high frequency carrier). Also, the term "modem" as used herein is not limited to conventional computer modems that convert digital signals to analog signals and vice versa (e.g., to send digital data signals over the analog Public Switched Telephone Network). For example, if a sensor outputs measurements in an analog format, then such measurements may only need to be modulated (e.g., spread spectrum modulation) and transmitted—hence no analog/digital conversion needed. As another example, a relay/slave modem or communication device may only need to identify, filter, amplify, and/or retransmit a signal received.

The term "valve" as used herein generally refers to any device that functions to regulate the flow of a fluid. Examples of valves include, but are not limited to, bellows-type gas-lift valves and controllable gas-lift valves, each of which may be used to regulate the flow of lift gas into a tubing string of a well. The internal and/or external workings of valves can vary greatly, and in the present application, it is not intended to limit the valves described to any particular configuration, so long as the valve functions to regulate flow. Some of the various types of flow regulating mechanisms include, but are not limited to, ball valve configurations, needle valve configurations, gate valve configurations, and cage valve configurations. The methods of installation for valves discussed in the present application can vary widely.

The term "electrically controllable valve" as used herein generally refers to a "valve" (as just described) that can be opened, closed, adjusted, altered, or throttled continuously in response to an electrical control signal (e.g., signal from a surface computer or from a downhole electronic controller module). The mechanism that actually moves the valve position can comprise, but is not limited to: an electric motor; an electric servo; an electric solenoid; an electric switch; a hydraulic actuator controlled by at least one electrical servo, electrical motor, electrical switch, electric solenoid, or combinations thereof; a pneumatic actuator controlled by at least one electrical servo, electrical motor, electrical switch, electric solenoid, or combinations thereof; or a spring biased device in combination with at least one electrical servo, electrical motor, electrical switch, electric solenoid, or combinations thereof. An "electrically controllable valve" may or may not include a position feedback sensor for providing a feedback signal corresponding to the actual position of the valve.

The term "sensor" as used herein refers to any device that detects, determines, monitors, records, or otherwise senses the absolute value of or a change in a physical quantity. A sensor as described herein can be used to measure physical quantities including, but not limited to: temperature, pressure (both absolute and differential), flow rate, seismic data, acoustic data, pH level, salinity levels, tracer presence, tracer concentration, chemical concentration, valve positions, or almost any other physical data.

The phrase "at the surface" as used herein refers to a location that is above about fifty feet deep within the Earth.

In other words, the phrase "at the surface" does not necessarily mean sitting on the ground at ground level, but is used more broadly herein to refer to a location that is often easily or conveniently accessible at a wellhead where people may be working. For example, "at the surface" can be on a table in a work shed that is located on the ground at the well platform, it can be on an ocean floor or a lake floor, it can be on a deep-sea oil rig platform, or it can be on the 100th floor of a building. Also, the term "surface" may be used herein as an adjective to designate a location of a component or region that is located "at the surface." For example, as used herein, a "surface" computer would be a computer located "at the surface."

The term "downhole" as used herein refers to a location or position below about fifty feet deep within the Earth. In other words, "downhole" is used broadly herein to refer to a location that is often not easily or conveniently accessible from a wellhead where people may be working. For example in a petroleum well, a "downhole" location is often at or proximate to a subsurface petroleum production zone, irrespective of whether the production zone is accessed vertically, horizontally, lateral, or any other angle therebetween. Also, the term "downhole" is used herein as an adjective describing the location of a component or region. For example, a "downhole" device in a well would be a device located "downhole," as opposed to being located "at the surface."

Also, the term "wireless" as used herein means the absence of a conventional, insulated wire conductor extending from the surface to a downhole device. Using a piping structure of a well (e.g., the tubing and/or casing) as an electrical conductor is considered "wireless."

Figure 1:
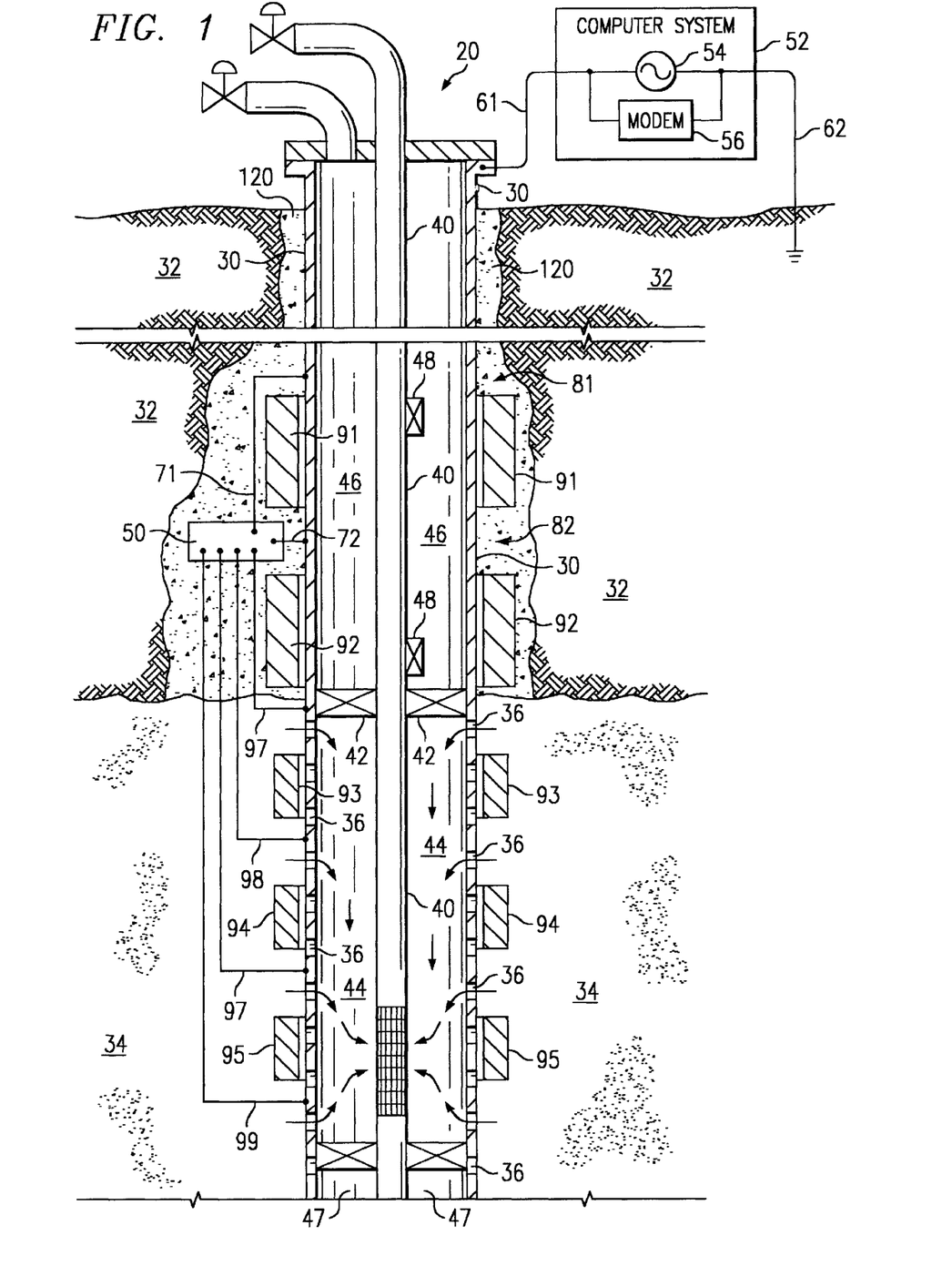
FIG. 1 is a schematic showing a petroleum production well in accordance with a preferred embodiment of the present invention.

FIG. 1 is a schematic showing a gas-lift, petroleum production well 20 in accordance with a preferred embodiment of the present invention. The well 20 has a well casing 30 extending within a wellbore and through a formation 32 to a production zone 34 farther downhole. A production tubing 40 extends within the well casing 30 for conveying fluids (e.g., oil, gas) from downhole to the surface during production operations. The well casing 30 has a perforated section 36 at the production zone 34 to allow fluids from the production zone 34 to enter the annulus region 44 formed between the casing 30 and the tubing 40. Packers 42 are located downhole within the casing 30 and about the tubing 40. The packers 42 are conventional and they hydraulically isolate the annulus region 44 at the production zone 34 from the annulus region 46 above the production zone, as well as the annulus region 47 below the production zone 34, but the placement of the packers 42 may vary. The packer 42 above the production zone 34 allows pressurized gas to be input into an annulus 36 from the surface. During gas-lift operation, such pressurized gas is further input into the tubing 40 via gas-lift valves 48 to provide gas-lift for fluids therein. Hence, the petroleum production well 20 shown in FIG. 1 is similar to a conventional well in construction, but with the incorporation of the present invention.

An electrical circuit is formed using the piping structure of the well 20 in FIG. 1. The electrical well circuit formed is used to provide power and/or communications to the downhole device 50. A surface computer system 52 provides the power and/or communications at the surface. The surface computer system 52 comprises a surface power source 54 and a surface modem 56, but the surface equipment components and configuration may vary, and/or have additional components. The power source 54 is adapted to output a time-varying current. The time-varying current is preferably alternating current (AC), but it can also be a varying direct current. Preferably, the communications signal provided by the surface modem 56 is a spread spectrum signal, but other forms of modulation or predistortion can be used in alternative. A first computer terminal 61 of the surface computer system 52 is electrically connected to the casing 30 at the surface. A second computer terminal 62 of the surface computer system 52 is electrically connected to the formation 32 at the surface.

The casing 30 acts as an electrical conductor for the well circuit. Hence in a preferred embodiment, as shown in FIG. 1, the casing 30 acts as a piping structure for conveying electrical power and/or communications between the surface computer system 52 and the downhole device 50, and the formation 32 acts as an electrical return. Also, as further described below, the casing 30 acts as the electrodes for measuring formation resistivity in the production zone 34.

The preferred embodiment of FIG. 1 has five induction chokes 91–95 located downhole about the casing 30. Each induction choke 91–95 is distally spaced from each other along the casing 30. Each induction choke 91–95 is generally ring shaped and is generally concentric about the casing 30, comprises a ferromagnetic material, and is unpowered. As described in further detail in the Related Applications, each induction choke 91–95 functions based on its size (mass), geometry, and magnetic properties, as well as its spatial relationship relative to the casing 30. Thus, each induction choke 91–95 can be designed to hinder or block a desired frequency range of time-varying current by varying the size, geometry, and/or magnetic properties of the induction choke.

The downhole device 50 has two device terminals 71, 72, which provide power and/or communications between the downhole device 50 and the surface computer system 52 via the casing 30 and the formation 32. A first of the device terminals 71 is electrically connected to the casing 30 on a source-side 81 of the first induction choke 91. A second of the device terminals 72 is electrically connected to the casing 30 on another side 82 of the first induction choke 91, or between the first induction choke 91 and the second induction choke 92. The device terminals 71, 72 are routed outside of the first induction choke 91 so that AC flowing through the device 50 via the device terminals 71, 72 is not affected by the first induction choke 91. The casing 30 is in electrical contact with the formation at the location 82 between the first and second induction chokes 91, 92. Thus, the formation 32 acts as an electrical return between the casing 30 at location 82 and the second computer terminal 62 at the surface.

The first and second induction chokes 91, 92 are adapted to block or significantly hinder AC flow within the casing 30 for the frequency range used to transmit power and/or communications downhole from the surface, as well as uphole to the surface. For example, the first and second chokes 91, 92 can be adapted to block AC with a frequency above 50 Hz, which covers the frequency range of an expected power and communications transmission. Some of the power transmitted along the casing 30 will be lost due to shorts between the casing 30 and the formation 32 because the electrical insulation ability of the cement 120 between the casing 30 and the formation 32 depends on how much moisture the cement has absorbed. Thus, the conductivity of the cement 120 can vary significantly at different locations along the well 20.

The downhole device 50 also has four electrode terminals 97–99 extending therefrom: two focusing electrode terminals 97, one measuring electrode terminal 98, and one electrical return electrode terminal 99. One of the focusing electrode terminals 97 is electrically connected to the casing 30 between the second and third induction chokes 92, 93. The measuring electrode terminal 98 is electrically connected to the casing 30 between the third and fourth induction chokes 93, 94. The other focusing electrode terminal 97 is electrically connected to the casing 30 between the fourth and fifth induction chokes 94, 95. The electrical return electrode terminal 99 is electrically connected to the casing 30 below the fifth induction choke 95. In other words, the fifth induction choke 95 is located between the casing electrical connection locations for the electrical return electrode terminal 99 and lower focusing electrode terminal 97.

Figure 2:
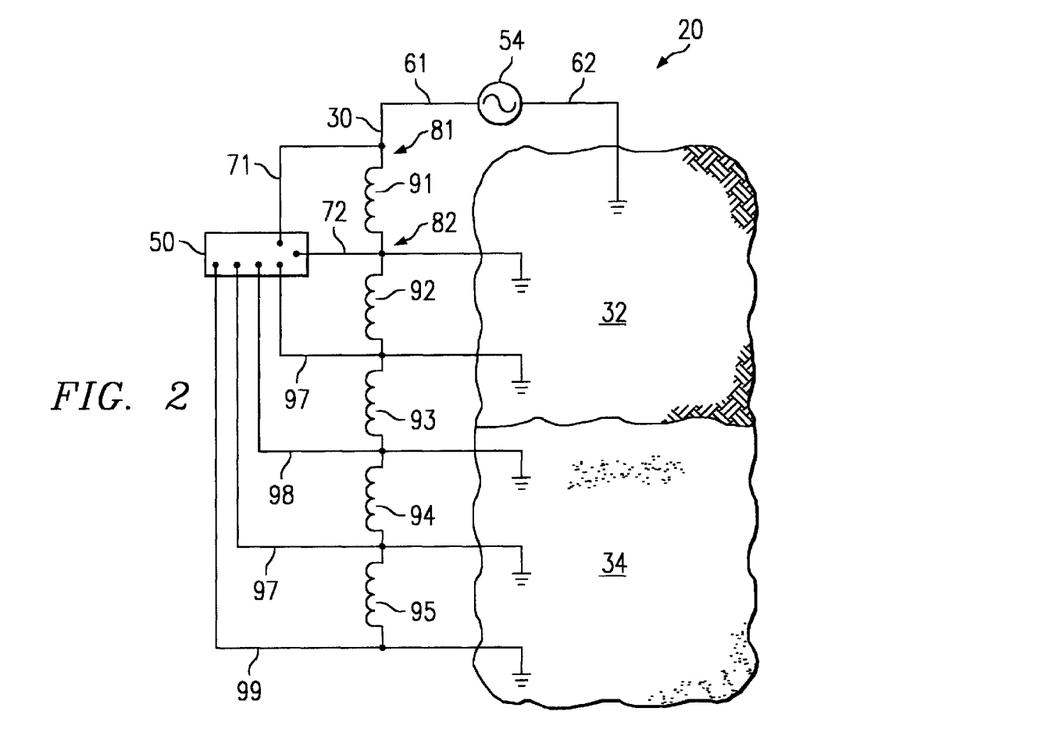
FIG. 2 is a simplified electrical schematic of the electrical circuit formed by the well of FIG. 1.

FIG. 2 is a simplified electrical schematic illustrating the electrical circuit formed in the well 20 of FIG. 1. In operation, power and/or communications (supplied by the surface computer system 52) are imparted into the casing 30 at the surface via the first computer terminal 61. The time-varying current is hindered from flowing from the casing 30 to the formation 32 (and to the second computer terminal 62) by the cement 120. However, the time-varying current flows freely downhole along the casing 30 until the first induction choke 91 is encountered. The first induction choke 91 provides a large inductance that impedes most of the current from flowing through the casing 30 at the first induction choke 91. Hence, a voltage potential forms between the casing 30 and the formation 32 due to the first induction choke 91. The voltage potential also forms between the casing 30 on the source-side 81 of the first induction choke 91 and the casing 30 on another side 82 of the first induction choke 91. Because the downhole device 50 is electrically connected across the voltage potential formed by the first induction choke 91, most of the current imparted into the casing 30 that is not lost along the way is routed through the downhole device 50 via the device terminals 71, 72, and thus provides power and/or communications to the downhole device 50. The second choke 92 hinders most of the current at the second device terminal 72 (at location 82) from flowing downhole along the casing 30 below the second induction choke 92. Thus after passing through the downhole device 50, the current returns to the surface computer system 52 via the formation 32 and the second computer terminal 62. When the current is AC, the flow of the current just described will also be reversed through the well 20 along the same path.

Other alternative ways to develop an electrical circuit using a piping structure of a well and at least one induction choke are described in the Related Applications, many of which can be applied in conjunction with the present invention to provide power and/or communications to the electrically powered downhole device 50 and to form other embodiments of the present invention.

Figure 3:
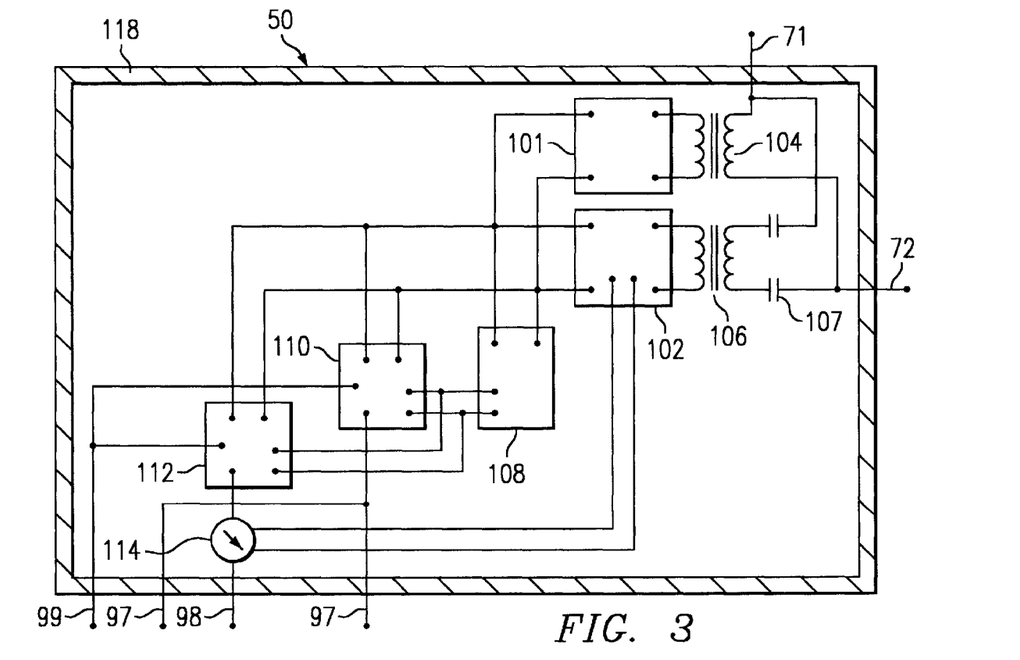
FIG. 3 is a simplified electrical schematic of the downhole device of FIGS. 1 and 2.

FIG. 3 is an electrical schematic of the downhole device 50 of FIGS. 1 and 2. The electrical schematic of the downhole device 50 in FIG. 3 is but one way, among many possible ways, to form an electrical circuit for performing the functions of the downhole device 50. The downhole device could be as simple as a wire connector (not shown) or as complex a computer system, depending on the application needs. The downhole device 50 of FIG. 3 comprises a DC power supply 101, a downhole modem 102, a power transformer 104, a communications transformer 106, a communications filter 107, a 1 kHz oscillator 108, two power amplifiers 110, 112, and a current sensor 114. The time-varying current carried downhole by the casing 30 is input into the first device terminal 71, and then passes through the power transformer 104 and the communications transformer 106 to the second device terminal 72. The power transformer 104 supplies power for the 12 volt DC power supply 101, which powers and drives the downhole device components. Communications signals carried within the time-varying current pass through the communications filter 107, which blocks out power frequencies, and through the communications transformer 106 to the downhole modem 102, which interprets and decodes the communications signals as needed. Also, the communications transformer 106 provides a link from the downhole modem 102 to the device terminals 71, 72 when the downhole modem 102 is used to transmit data uphole to the surface modem 56 via the casing 30 and the computer system terminals 61, 62.

The DC power supply 101 provides power for the downhole modem 102, the oscillator 108, and the power amplifiers 110, 112. The oscillator 108 generates a 1 kHz time-varying signal, which is input to the power amplifiers 110, 112. One of the power amplifiers 110 is used to drive the focusing electrode terminals 97. The other power amplifier 112 is used to drive the measuring electrode terminal 98. The electrical return electrode terminal 99 is electrically connected to both amplifiers 110, 112. The output of the measuring electrode terminal 98 passes through the current sensor 114, which measures the current flow through the measuring electrode terminal 98. The current sensor 114 outputs current measurement data to the downhole modem 102, which in turn transmits the current measurement data to the surface computer system 52 via the casing 30. Preferably, the power amplifiers 110, 112 are adapted to output the same voltage level to the focusing electrode terminals 97 and the measuring electrode terminal 98 so that the voltage potential between these terminals 97, 98 and the electrical return electrode terminal 99 remains the same. This configuration provides a focusing effect for deeper penetration in the production zone 34 of the current flow between the measuring electrode terminal 98 and the electrical return electrode 99.

Referring to FIG. 2 again, the electrode terminals 97–99 are all electrically connected to the casing 30, but each in different locations and each separated by the induction chokes 93–95. Thus, the induction chokes 92–95 form four isolated casing sections for the electrode terminals 97–99, which allows the casing 30 to act as an electrode for each of the electrode terminals 97–99. Preferably the second induction choke 92 blocks all or most of the power and communications AC to prevent interference with the electrode terminals 97–99. Because the frequency of the AC at the electrode terminals 97–99 for the formation resistivity measurements is at a higher frequency in this case (i.e., 1 kHz), the third, fourth, and fifth induction chokes 93–95 can be smaller than the first and second induction chokes 91, 92. However in other possible embodiments, the chokes 91–95 may all be the same size, may all differ in size, or may vary in other combinations. The choke characteristics (size, geometry, magnetic properties) can be varied by design to correlate with the anticipated frequency and power level of the time-varying currents to be used.

In operation, the method for formation resistivity measurement is analogous to that used in open-hole focused resistivity measurement. The electrical potentials imparted to the formation by means of casing sections connected to terminals 97 act to create an electrical field in the formation such that the equipotential surfaces of this field are approximately parallel to the well axis in the region of the formation adjacent to the casing section connected to terminal 97. This electrical field configuration induces current flowing from terminal 98 by way of the casing and into the formation to penetrate relatively deeply into the formation before returning to measurement ground terminal 99. Measurement of the current on electrode 98 therefore allows the resistivity of the formation at a distance from the borehole to be determined.

As shown in FIGS. 1–3, preferably the components of the downhole device 50 are all contained in a single, sealed device pod 118 together as one module for ease of handling and installation, as well as to protect the components from the surrounding environment. But in other embodiments of the present invention, the components of the downhole device 50 can be separate (i.e., no device pod 118) or combined in other combinations. Also, the device pod 118 may be attached to the casing 30, and distributed about the casing 30 to provide a low profile for the device 50 (this configuration not shown), which would make the device 50 easier to install. The device pod 118 may further cover and enclose the induction chokes 91–95 and the terminals 71, 72, and 97–99 extending therefrom (this configuration not shown), and thus the device 50, its terminals 71, 72, and 97–99, the chokes 91–95, and the casing section 36 where all of the components are located may be installed together like any other casing section. Such a configuration would be much more streamlined and easier to install in some respects, but the weight may become too large for handling without special tools due to the weight of multiple induction chokes.

The components of the downhole devices 50 may vary to form many possible embodiments of the present invention. For example, a downhole device 50 may comprise the following components in addition to or in substitute for the components shown in FIG. 3 (but is not limited to this exemplary list): an electric servo, another electric motor, a sensor or transducer, transducers, an electrically controllable tracer injection device, an electrically controllable chemical injection device, a chemical or tracer material reservoir, an electrically controllable valve, a modem, a communications and control module, a logic circuit, a computer system, a memory storage device, a microprocessor, a power transformer, a power storage module or device, an electrically controllable hydraulic pump and/or actuator, an electrically controllable pneumatic pump and/or actuator, controllable, individually addressable, electrical by-pass switch, or any combination thereof.

Figure 4:
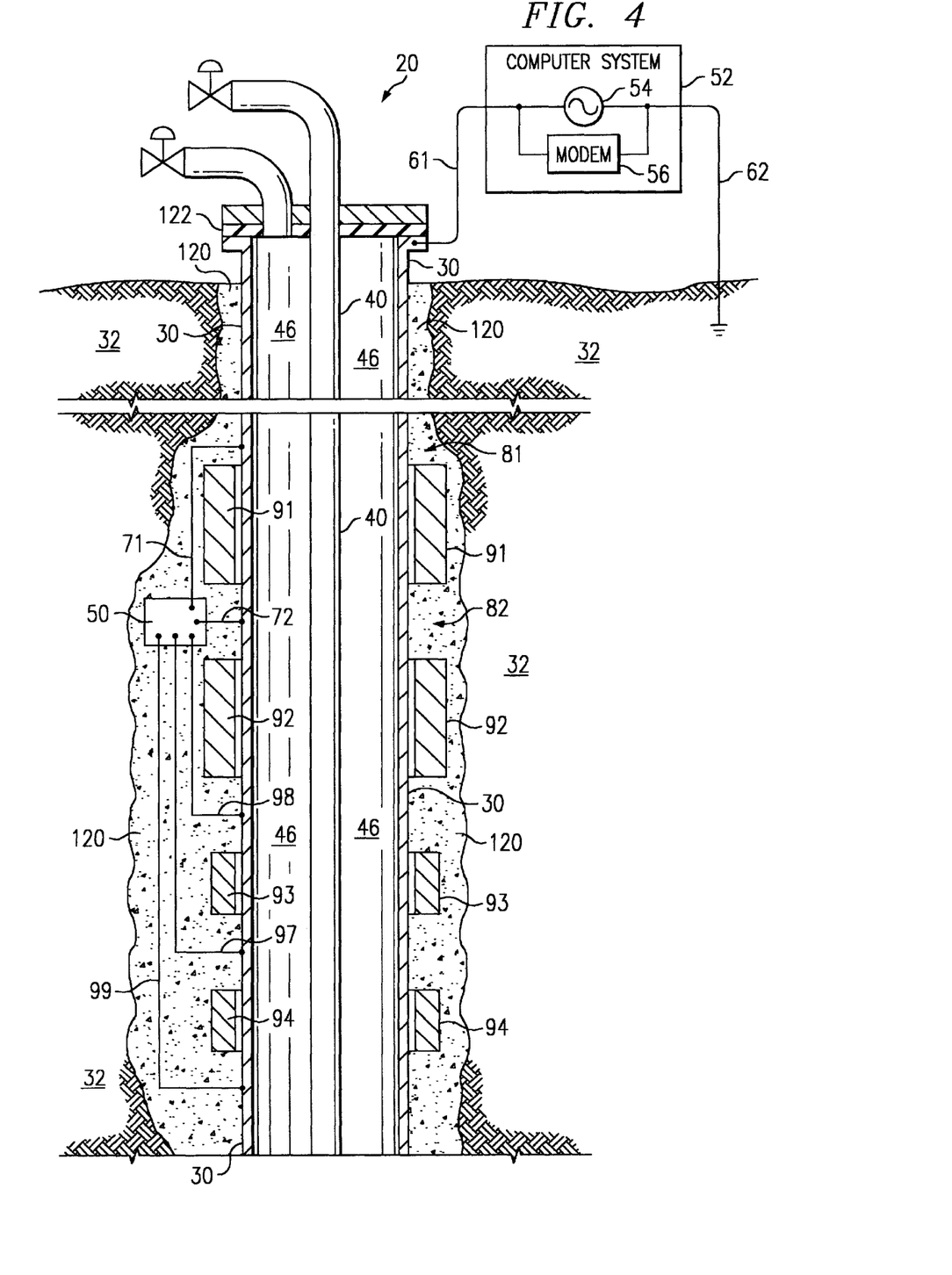
FIG. 4 is a schematic showing a petroleum production well in accordance with another preferred embodiment of the present invention.

FIG. 4 is a schematic of another preferred embodiment of the present invention. The embodiment of FIG. 4 is similar to that of FIGS. 1–3, but it is simplified by having only one focusing electrode terminal 97 and four induction chokes 91–94. The embodiment of FIG. 4 adds an insulator 122 between the casing 30 and the hanger. Hence, the insulator 122 electrically insulates the equipment above the casing 30 from the current being input into the casing 30 at the first computer terminal 61. For example, this may be a desirable feature for safety reasons, depending on the power level being used, for noise isolation, or for power conservation.

In operation, the method for formation resistivity measurement is analogous to that used in open-hole focused resistivity measurement. The electrical potential imparted to the formation by means of casing section connected to terminal 97 acts to create an electrical field in the formation such that current flowing from terminal 98 by way of the casing and into the formation penetrates further into the formation than would be the case without the guard electrode 97. Measurement of the current on electrode 98 therefore allows the resistivity of the formation at modest distance from the borehole to be determined.

Figure 5:
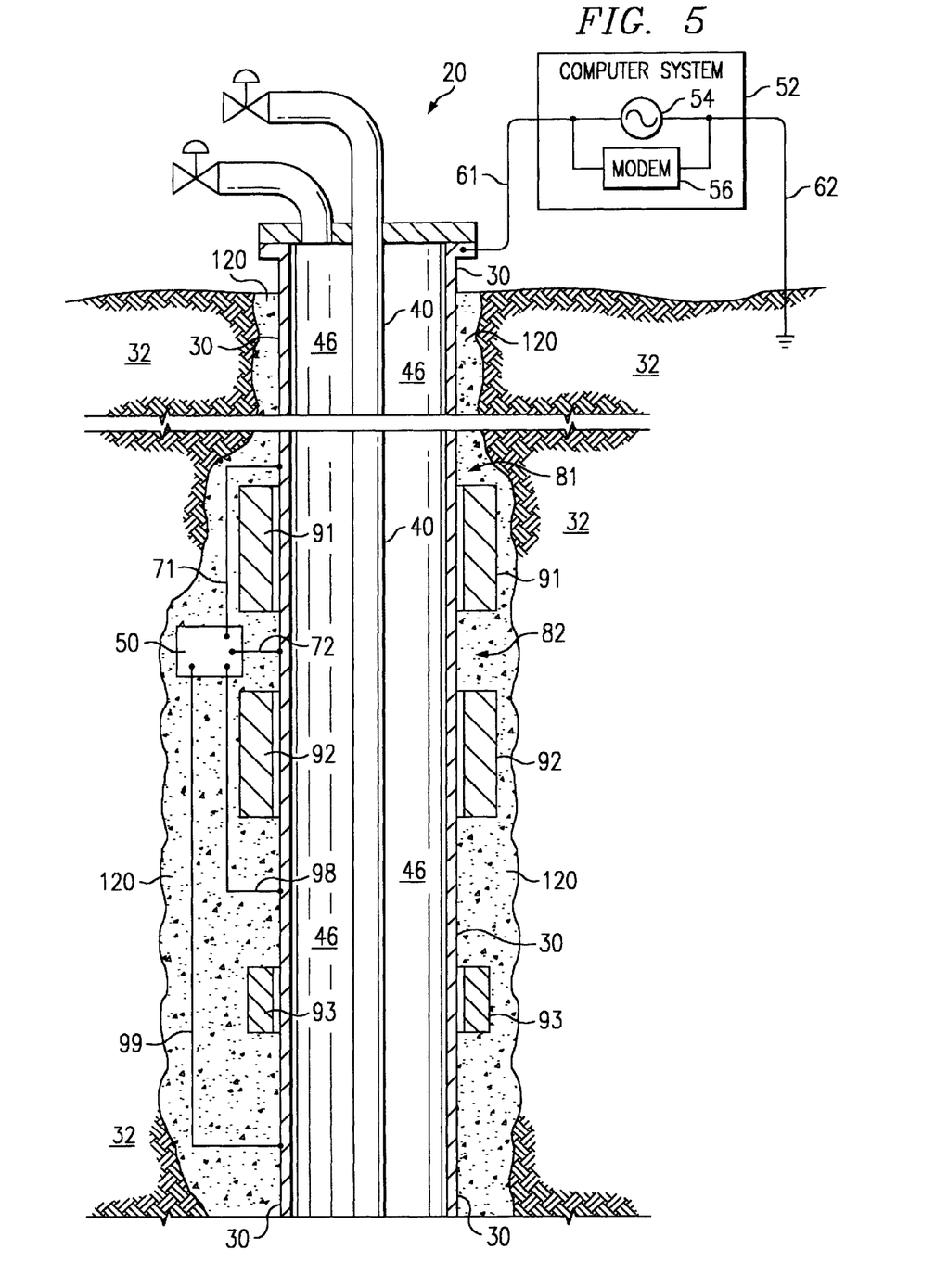
FIG. 5 is a schematic showing a petroleum production well in accordance with yet another preferred embodiment of the present invention.

FIG. 5 is a schematic of yet another preferred embodiment of the present invention. The embodiment of FIG. 5 is similar to that of FIGS. 1–4, but it is further simplified by not having a focusing electrode terminal 97. Although the embodiment of FIG. 5 may not measure the formation resistivity as deeply (i.e., as far away from the casing 30) as the embodiments of FIGS. 1–4, it may still be adequate for a given application or it may be desirable for its increased simplicity.

In the embodiment of FIGS. 1–3, the electrode terminals 97–99 are electrically connected to the casing 30 at the production zone 34 where the casing has a perforated section 36. But, as shown in FIGS. 4–5, the electrode terminals 97–99 can be electrically connected to the casing 30 at other locations to measure the formation resistivity at other locations as well. In FIGS. 4 and 5, the production zone 34 is not shown because it is farther downhole. Although not expected, the present invention will often still function with cement 120 between the casing 30 and formation 32 at the location where the formation resistivity is being measured. Such measurements through cement 120 are possible because often the cement downhole near a production zone is highly saturated with fluids that are somewhat electrically conductive, such as a brine or saline solution.

The present invention can be incorporated multiple times into a single petroleum well having one or more production zones, or into a petroleum well having multiple lateral or horizontal completions extending therefrom. Because the configuration of a well is dependent on the natural formation layout and locations of the production zones, the number of applications or the arrangement of an embodiment of the present invention may vary accordingly to suit the formation or the well operation plans.

Figure 6A:
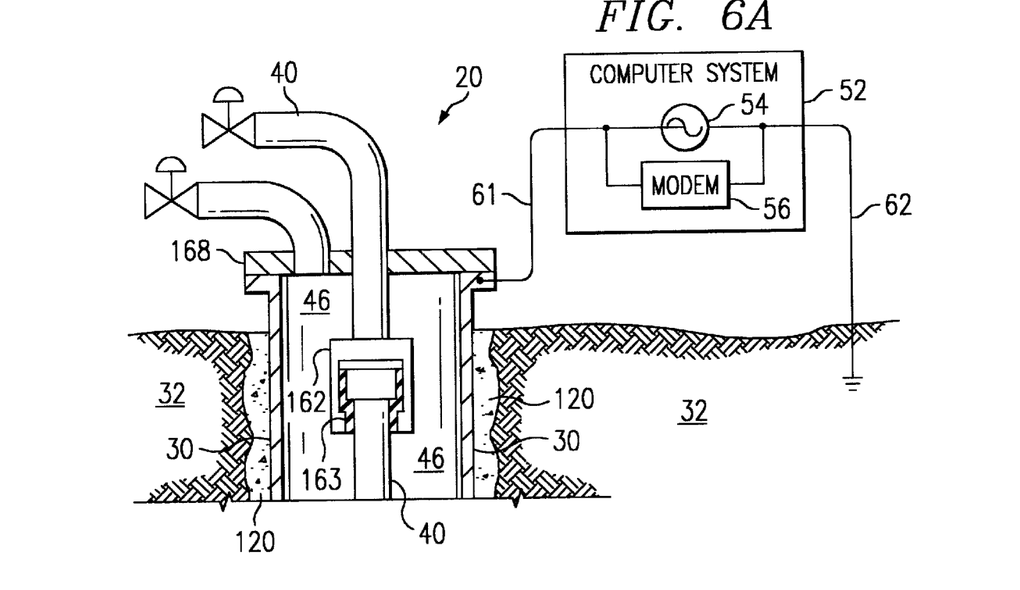
FIG. 6A is a schematic showing an upper portion of a petroleum production well in accordance with still another preferred embodiment of the present invention.
Figure 6B:
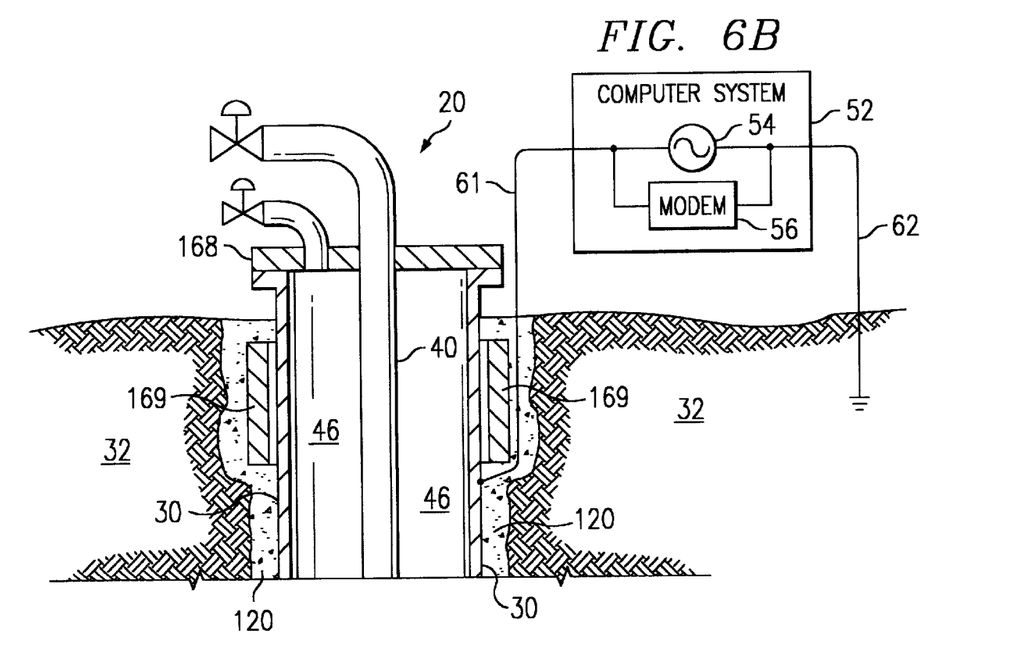
FIG. 6B is a schematic showing an upper portion of a petroleum production well in accordance with yet another preferred embodiment of the present invention.
Figure 6C:
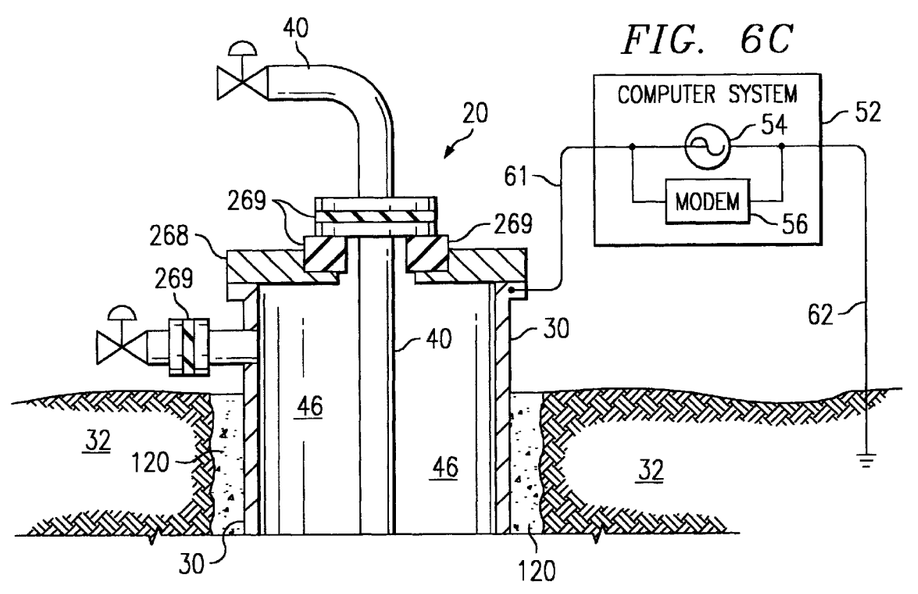
FIG. 6C is a schematic showing an upper portion of a petroleum production well in accordance with a further preferred embodiment of the present invention.

FIGS. 6A–6C illustrate some possible variations in the upper section of the well 20 to form other possible embodiments of the present invention. In FIG. 6A, an insulated tubing joint 162 is incorporated just below the hanger 168. An insulator 163 in the insulated tubing joint 162 prevents current from flowing along the tubing 40 at the insulated tubing joint 162. Thus, the insulated tubing joint 162 electrically insulates the tubing 40 from the hanger 168, as well as the casing 30 and first computer terminal 61 at the surface. An insulated tubing joint 162 also may be located elsewhere within the well 20, such as farther downhole.

In FIG. 6B, an additional upper induction choke 169 is incorporated about the casing 30 at the surface. The first computer terminal 61 is electrically connected to the casing 30 below the upper induction choke 169. Thus, the upper induction choke 169 can impede time-varying current from flowing through the casing 30 to the hanger 168. Incorporating the upper induction choke 169 as in FIG. 6B may be desired for safety reasons, or to impede time-varying current from flowing down the tubing 40 and into other equipment attached to the well head at the surface. In FIG. 6C, an insulated hanger 268 is incorporated at the surface. The insulators 269 prevent current from flowing from the casing 30 into the tubing 40 and into other equipment attached to the well head at the surface. Therefore, many variations of the upper section of the well 20 are possible to form other embodiments of the present invention.

The present invention can be applied to any type of petroleum well (e.g., exploration well, injection well, production well, rod-pumping or suction well) where formation or production zone resistivity measurements may be desired. The present invention also may be applied to other types of wells (other than petroleum wells), such as a water production well.

It will be appreciated by those skilled in the art having the benefit of this disclosure that this invention provides a system and method of measuring formation resistivity for a formation and/or a production zone of a petroleum production well while producing from the well. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

The invention claimed is:

1. A system for measuring a formation resistivity in a petroleum well, comprising
   a first induction choke located about a piping structure of said well;
   a second induction choke located about said piping structure of said well, wherein said first induction choke is distally spaced from said second induction choke;
   a device for measuring the formation resistivity located outside of said piping structure and comprising two terminals,
      a first of said terminals extending from said device being electrically connected to said piping structure on one side of said first induction choke,
      a second of said terminals extending from said device being electrically connected to said piping structure on another side of said first induction choke between said first and second induction chokes, such that said device is electrically connected across an outside of said first induction choke, and the device operable to measure current flow through at least one of said terminals as an indication of formation resistivity.

2. A system in accordance with claim 1, further comprising:
   a third terminal extending from said device and being electrically connected to said piping structure such that said second induction choke is located between said second terminal and said third terminal.

3. A system in accordance with claim 2, further comprising:
   a third induction choke located about said piping structure of said well, wherein said third induction choke is distally spaced from said first and second induction chokes;
   a fourth terminal extending from said device and being electrically connected to said piping structure such that said third induction choke is located between said third and fourth terminals.

4. A system in accordance with claim 3, wherein said first and second terminals are adapted to provide power and communications connections between said device and said piping structure, wherein said third terminal is a measuring electrode terminal, and wherein said fourth terminal is an electrical return terminal for said measuring terminal.

5. A system in accordance with claim 3, further comprising:
   a fourth induction choke located about said piping structure of said well, wherein said fourth induction choke is distally spaced from said first, second, and third induction chokes;
   a fifth terminal extending from said device and being electrically connected to said piping structure such that said fourth induction choke is located between said fourth and fifth terminals.

6. A system in accordance with claim 5, wherein said first and second terminals are adapted to provide power and communications connections between said device and said piping structure, wherein said third terminal is a measuring electrode terminal, wherein said fourth terminal is a focusing electrode terminal, and wherein said fifth terminal is an electrical return terminal for said measuring and focusing terminals.

7. A system in accordance with claim 5, further comprising:
   a fifth induction choke located about said piping structure of said well, wherein said fifth induction choke is distally spaced from said first, second, third, and fourth induction chokes;
   a sixth terminal extending from said device and being electrically connected to said piping structure such that said fifth induction choke is located between said six and fifth terminals.

8. A system in accordance with claim 7, wherein said first and second terminals are adapted to provide power and communications connections between said device and said piping structure, wherein said third terminal is a first focusing electrode terminal, wherein said fourth terminal is a measuring electrode terminal, wherein said fifth terminal is a second focusing electrode terminal, and wherein said sixth terminal is an electrical return terminal for said measuring and focusing terminals.

9. A system in accordance with claim 8, wherein said induction chokes each comprise a ferromagnetic material, and each of said induction chokes being unpowered and adapted to operate due to its size, geometry, and magnetic properties.

10. A petroleum well for producing petroleum products, comprising:
    a piping structure of said well extending within a formation;
    a first induction choke located downhole about said piping structure;
    a second induction choke located downhole about said piping structure, wherein said second induction choke is distally spaced from said first induction choke;
    a third induction choke located downhole about said piping structure, wherein said third induction choke is distally spaced from said first and second induction chokes;
    a downhole device for measuring the electrical properties in the petroleum well in the region of one or more of said induction chokes comprising:
       a first device terminal electrically connected to said piping structure on a one side of said first induction choke,
       a second device terminal electrically connected to said piping structure on another side of said first induction choke between said first and second induction chokes, such that said downhole device is electrically connected across an outside of said first induction choke,
       a first electrode terminal electrically connected to said piping structure between said second and third induction chokes, and
       a second electrode terminal electrically connected to said piping structure such that said third induction choke is located between the electrical connection location on said piping structure of said first and second electrode terminals.

11. A petroleum well in accordance with claim 10, wherein said first electrode terminal and said piping structure form a measuring electrode, and wherein said second electrode terminal and said piping structure form an electrical return electrode for said measuring electrode.

12. A petroleum well in accordance with claim 10, further comprising:
a power source being adapted to output a time-varying current, and said power source having two power source terminals, a first of said power source terminals being electrically connected to said piping structure at the surface, and a second of said power source terminals being electrically connected to said formation at the surface; and
a surface modem having two surface modem terminals, a first of said surface modem terminals being electrically connected to said piping structure at the surface, and a second of said surface modem terminals being electrically connected to said formation at the surface.

13. A petroleum well in accordance with claim 12, wherein said downhole device further comprises:
a downhole modem being communicably coupled to said device terminals, such that said downhole modem can send and receive communications signals via said device terminals and said piping structure.

14. A petroleum well in accordance with claim 13, wherein said downhole device further comprises:
a current sensor adapted to measure a current flowing through said first electrode terminal, and said current sensor being communicably coupled to said downhole modem, such that said downhole modem is adapted to receive and transmit measurement data from said current sensor.

15. A petroleum well in accordance with claim 10, further comprising:
a fourth induction choke located downhole about the piping structure, wherein said fourth induction choke is distally spaced from said first, second, and third induction chokes; and
wherein said downhole device further comprises a third electrode terminal electrically connected to said piping structure such that said fourth induction choke is located between the electrical connection location on said piping structure of said second and third electrode terminals.

16. A petroleum well in accordance with claim 15, wherein said first electrode terminal and said piping structure form a measuring electrode, wherein said second electrode terminal and said piping structure form a focusing electrode, and wherein said third electrode terminal and said piping structure form an electrical return electrode for said measuring electrode and said focusing electrode.

17. A petroleum well in accordance with claim 16, further comprising:
a power source being adapted to output a time-varying current, and said power source having two power source terminals, a first of said power source terminals being electrically connected to said piping structure at the surface, and a second of said power source terminals being electrically connected to said formation at the surface;
a surface modem having two surface modem terminals, a first of said surface modem terminals being electrically connected to said piping structure at the surface, and a second of said surface modem terminals being electrically connected to said formation at the surface; and
wherein said downhole device further comprises:
a downhole modem being communicably coupled to said device terminals, such that said downhole modem can send and receive communications signals via said device terminals and said piping structure, and
a current sensor adapted to measure a current flowing through said first electrode terminal, and said current sensor being communicably coupled to said downhole modem, such that said downhole modem is adapted to receive and transmit measurement data from said current sensor.

18. A petroleum well in accordance with claim 15, further comprising:
a fifth induction choke located downhole about the piping structure, wherein said fifth induction choke is distally spaced from said first, second, third, and fourth induction chokes; and
wherein said downhole device further comprises a fourth electrode terminal electrically connected to said piping structure such that said fifth induction choke is located between the electrical connection location on said piping structure of said third and fourth electrode terminals.

19. A petroleum well in accordance with claim 18, wherein said first electrode terminal and said piping structure form a focusing electrode, wherein said second electrode terminal and said piping structure form a measuring electrode, wherein said third electrode terminal and said piping structure form a focusing electrode, and wherein said fourth electrode terminal and said piping structure form an electrical return electrode for said measuring electrode and said focusing electrodes.

20. A petroleum well in accordance with claim 19, further comprising:
a power source being adapted to output a time-varying current, and said power source having two power source terminals, a first of said power source terminals being electrically connected to said piping structure at the surface, and a second of said power source terminals being electrically connected to said formation at the surface;
a surface modem having two surface modem terminals, a first of said surface modem terminals being electrically connected to said piping structure at the surface, and a second of said surface modem terminals being electrically connected to said formation at the surface; and
wherein said downhole device further comprises:
a downhole modem being communicably coupled to said device terminals, such that said downhole modem can send and receive communications signals via said device terminals and said piping structure, and
a current sensor adapted to measure a current flowing through said second electrode terminal, and said current sensor being communicably coupled to said downhole modem, such that said downhole modem is adapted to receive and transmit measurement data from said current sensor.

21. A petroleum well in accordance with claim 20, wherein said downhole device further comprises a power storage device adapted to store electrical power and provide electrical power to said downhole device as needed.

22. A petroleum well in accordance with claim 20, wherein said downhole device further comprises a sensor.

23. A petroleum well in accordance with claim 10, wherein said piping structure comprises at least a portion of a well casing.

24. A system in accordance with claim 10, wherein each of said induction chokes comprise a ferromagnetic material, is unpowered, and is adapted to operate due to its size, geometry, and magnetic properties.

25. A petroleum well for producing petroleum products where formation resistivity is measured, comprising:
- a well casing extending into a formation;
- a power source being adapted to output a time-varying current, and said power source having two power source terminals, a first of said power source terminals being electrically connected to said casing at the surface, and a second of said power source terminals being electrically connected to said formation;
- a surface modem having two surface modem terminals, a first of said surface modem terminals being electrically connected to said casing at the surface, and a second of said surface modem terminals being electrically connected to said;
- a first induction choke located downhole about said casing;
- a second induction choke located downhole about said casing, wherein said second induction choke is distally spaced from said first induction choke, and wherein said second induction choke is located farther downhole than said first induction choke;
- a third induction choke located downhole about said casing, wherein said third induction choke is distally spaced from said first and second induction chokes, and wherein said third induction choke is located farther downhole than said second induction choke;
- a downhole device for measuring and communicating said formation resistivity comprising:
  - a first device terminal electrically connected to said casing on a source-side of said first induction choke,
  - a second device terminal electrically connected to said casing on another side of said first induction choke between said first and second induction chokes, such that said downhole device is electrically connected across an outside of said first induction choke,
  - a first electrode terminal electrically connected to said casing between said second and third induction chokes,
  - a second electrode terminal electrically connected to said casing such that said third induction choke is located between the electrical connection location on said casing of said first and second electrode terminals,
  - a downhole modem being communicably coupled to said device terminals, such that said downhole modem can send and receive communication signals along said casing via said device terminals, and
  - a current sensor adapted to measure current flowing through at least one of said first and second electrode terminals as an indication of formation resistivity, and said current sensor being communicably coupled to said downhole modem, such that said downhole modem is adapted to receive measurement data related to said current flow measure from said current sensor and transmit said measurement data to said surface modem via said casing.

26. A petroleum well in accordance with claim 25, wherein said first electrode terminal, said casing, said second induction choke, and said third induction choke form a measuring electrode, and wherein said second electrode terminal, said third induction choke, and said casing form an electrical return electrode for said measuring electrode.

27. A petroleum well in accordance with claim 26, wherein said downhole device further comprises:
- a power transformer electrically connected across said device terminals;
- a communications transformer electrically connected across said device terminals, wherein said downhole modem is communicably coupled to said device terminals via said communications transformer;
- a direct current power supply electrically connected to said power transformer, wherein said downhole modem is electrically connected to said direct current power supply;
- an oscillator electrically connected to said direct current power supply, and being adapted to generate a time-varying signal; and
- a power amplifier electrically connected to said direct current power supply, said oscillator, said first electrode terminal, and said second electrode terminal.

28. A petroleum well in accordance with claim 25, further comprising:
- a fourth induction choke located downhole about said casing, wherein said fourth induction choke is distally spaced from said first, second, and third induction chokes, and wherein said fourth induction choke is located farther downhole than said third induction choke; and
- wherein said downhole device further comprises a third electrode terminal electrically connected to said casing such that said fourth induction choke is located between the electrical connection location on said casing of said second and third electrode terminals.

29. A petroleum well in accordance with claim 28, wherein said first electrode terminal, said casing, said second induction choke, and said third induction choke form a measuring electrode, wherein said second electrode terminal, said casing, said third induction choke, and said fourth induction choke form a focusing electrode, and wherein said third electrode terminal, said casing, and said fourth induction choke form an electrical return electrode for said measuring electrode and said focusing electrode.

30. A petroleum well in accordance with claim 29, wherein said downhole device further comprises:
- a power transformer electrically connected across said device terminals;
- a communications transformer electrically connected across said device terminals, wherein said downhole modem is communicably coupled to said device terminals via said communications transformer ;
- a direct current power supply electrically connected to said power transformer, wherein said downhole modem is electrically connected to said direct current power supply;
- an oscillator electrically connected to said direct current power supply, and being adapted to generate a time-varying signal; and
- a first power amplifier electrically connected to said direct current power supply, said oscillator, said first electrode terminal, and said third electrode terminal; and
- a second power amplifier electrically connected to said direct current power supply, said oscillator, said second electrode terminal, and said third electrode terminal.

31. A petroleum well in accordance with claim 28, further comprising:
  a fifth induction choke located downhole about said casing, wherein said fifth induction choke is distally spaced from said first, second, third and fourth induction chokes, and wherein said fifth induction choke is located farther downhole than said fourth induction choke; and
  wherein said downhole device further comprises a fourth electrode terminal electrically connected to said casing such that said fifth induction choke is located between the electrical connection location on said casing of said third and fourth electrode terminals.

32. A petroleum well in accordance with claim 31, wherein said first electrode terminal, said casing, said second induction choke, and said third induction choke form a first focusing electrode, wherein said second electrode terminal, said casing, said third induction choke, and said fourth induction choke form a measuring electrode, wherein said third electrode terminal, said casing, said fourth induction choke, and said fifth induction choke form a second focusing electrode, and wherein said fourth electrode terminal, said casing, and said fifth induction choke form an electrical return electrode for said measuring electrode and said focusing electrodes.

33. A petroleum well in accordance with claim 32, wherein said downhole device further comprises:
  a power transformer electrically connected across said device terminals;
  a communications transformer electrically connected across said device terminals, wherein said downhole modem is communicably coupled to said device terminals via said communications transformer;
  a direct current power supply electrically connected to said power transformer, wherein said downhole modem is electrically connected to said direct current power supply;
  an oscillator electrically connected to said direct current power supply, and being adapted to generate a time-varying signal;
  a first power amplifier electrically connected to said direct current power supply, said oscillator, said first electrode terminal, said third electrode terminal, and said fourth electrode terminal; and
  a second power amplifier electrically connected to said direct current power supply, said oscillator, said second electrode terminal, and said fourth electrode terminal.

34. A petroleum well in accordance with claim 25, wherein said downhole device further comprises a power storage device adapted to store electrical power and provide electrical power to said downhole device as needed.

35. A petroleum well in accordance with claim 25, wherein said downhole device further comprises a sensor.

36. A method of measuring formation resistivity in a petroleum well, comprising the steps of:
  providing a piping structure of said well;
  providing a system for measuring formation resistivity in said well, said system comprising:
    a first induction choke located about said piping structure,
    a second induction choke located about said piping structure, wherein said first induction choke is distally spaced from said second induction choke, and
    a device located outside of said piping structure and having a terminal electrically connected to said piping structure between said first and second induction chokes;
  inducing a current flow through the formation; and
  measuring the current flow through the terminal as an indication of the resistivity of the formation.

37. A method in accordance with claim 36, further comprising the step of:
  monitoring for changes in formation resistivity while producing petroleum products with said well by repeating said measuring step as needed.

38. A method in accordance with claim 36, further comprising the steps of:
  providing a surface modem having two surface modem terminals, a first of said surface modem terminals being electrically connected to said piping structure at the surface, and a second of said surface modem terminals being electrically connected to said formation at the surface;
  providing a downhole modem for said system, said downhole modem being communicably coupled to said terminals; and
  transmitting formation resistivity data generated in said measuring step to said surface modem with said downhole modem via said piping structure.

39. A method in accordance with claim 36, further comprising the steps of:
  providing a third induction choke as a part of said system, said third induction choke being located about said piping structure, and being distally spaced from said first and second induction chokes;
  providing a measuring electrode terminal extending from said device and that is electrically connected to said piping structure between said second and third induction chokes;
  providing an electrical return electrode terminal extending from said device and that is electrically connected to said piping structure such that said third induction choke is located between the electrical connection location on said piping structure of said measuring electrode terminal and said electrical return electrode terminal; and
  providing a current sensor on said measuring electrode terminal such that said current sensor can measure electrical current flow within said measuring electrode terminal, such that the electrical current flow in said measuring electrode terminal correlates to the formation resistivity.

40. A method in accordance with claim 39, further comprising the step of:
  monitoring for changes in formation resistivity while producing petroleum products with said well by repeating said measuring step as needed.

* * * * *